Aug. 19, 1958
H. BULLARD
2,847,923
TWO-ROW MARKER
Filed June 14, 1957
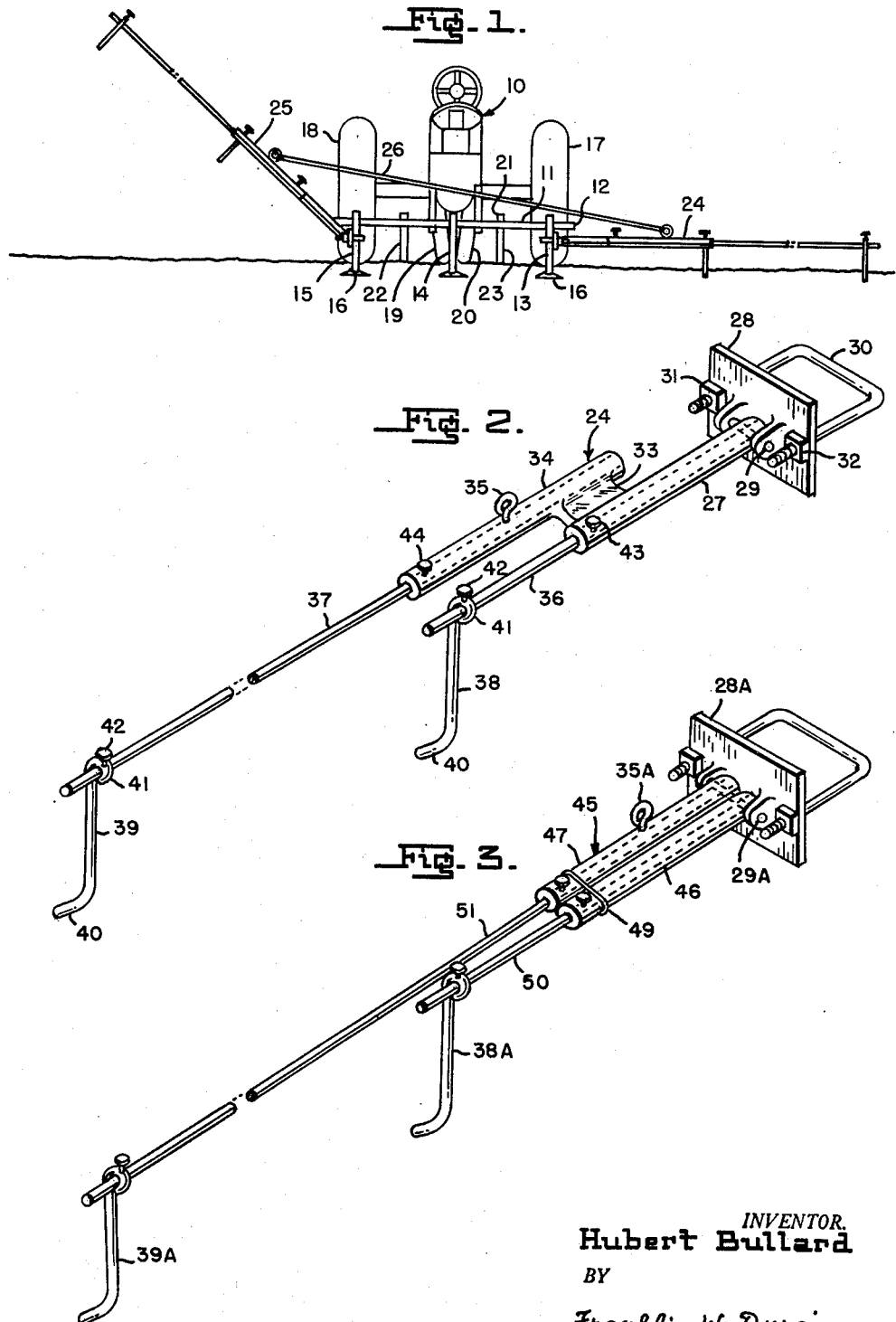
INVENTOR.
Hubert Bullard
BY
Franklin W. Durgin
AGENT.

United States Patent Office 2,847,923
Patented Aug. 19, 1958

2,847,923
TWO-ROW MARKER
Hubert Bullard, Lumberton, N. C.
Application June 14, 1957, Serial No. 665,859
2 Claims. (Cl. 97—230)

The invention relates to improvements in land markers and more particularly to an improved two-row marker for use with agricultural implements.

An important object of the invention is to provide a row marker which may be used for marking single rows of different widths and which may be adjusted to mark two rows and skip one row every so often when desired, as for instance to conform with crop reduction requirements of the Department of Agriculture or to provide a wider-than-usual space for the passage of tractor-drawn farm equipment such as tobacco sprayers and harvesters.

Another object of the invention is the provision of a row marker which may be clamped to the shank of an agricultural implement and adjusted to mark rows spaced any one of a plurality of distances from the implement shank.

Other objects and advantages of the invention will become apparent during the course of the following detailed description taken in connection with accompanying drawing forming a part of this specification and in which drawing, Fig. 1 is a view in rear elevation of a tractor-drawn implement assemblage showing attached thereto, right and left row marking devices constructed in accordance with the present invention.

Fig. 2 is a perspective view of the right row marker shown in Fig. 1.

Fig. 3 is a perspective view of a modified form of right row marker.

In the drawing which for the purpose of illustration shows preferred and modified forms of the invention the numeral 10 generally designates a tractor hitched to an agricultural implement assemblage 11 which includes a rear cross frame member 12 to which are secured the shanks 13, 14, 15 of a plurality of implements 16.

The tractor 10 may be of any suitable type but the one shown in the example is equipped with right and left rear wheels 17, 18 and tricycle type front wheels 19, 20. The tractor 10 may also be hitched to a forward implement assemblage 21 including left and right implement shanks 22, 23 on opposite sides of the tricycle wheels 19, 20. Clamped to the right and left rear implement shanks 13, 15 are right and left row marking devices 24, 25 respectively that are preferably connected by a cable or rope 26 so that when the right row marking device 24 is in its lower or marking position, as shown, the left marking device 25 is maintained in an elevated or inoperative position, and vice versa.

Referring to Fig. 2 of the drawing the right row marking device 24 comprises a first tube 27 that is pivotally supported on a bracket 28 as by a horizontally disposed pivot pin 29. This bracket 28 is releasably clamped to the right rear implement shank 13 as by any suitable means such as a U-bolt 30 and nuts 31, 32.

Affixed to and extending beyond the free end portion of the first tube 27 and in spaced parallel relation thereto as by a lateral integral web 33 is a second tube 34 to which is secured an eye 35 for attachment of one end of the rope or cable 26.

Telescopically slidably adjustable in the first and second tubes 27, 34 are the inner end portions of two rods 36, 37 each of which is provided at its outer end portions with a land marking finger 38, 39. Each land marking finger 38, 39 is formed of a length of rod having one end portion 40, bent rearwardly, that is, opposite the marking direction, and a curved loop 41 releasably secured in any one of a plurality of longitudinally or radially adjusted positions on its supporting rod 36, 37 as by a set screw 42. The tubes 27, 34 are also provided with set screws 43, 44 for releasably fixing the rods 36, 37 in a set position relative to the tubes. The left how marking device 25 is a reversely constructed counterpart of the right row marking device 24 shown in Fig. 2 and accordingly is not described in detail.

Referring now to the modified form of row marking device 45, shown in Fig. 3, it comprises a pair of tubes 46, 47 pivotally supported in adjacent parallel relation on a bracket 28A that is like the bracket 28 shown in Fig. 2 except for increased width and a longer pivot pin 29A. These tubes 46, 47 are suitably fastened together at their free ends as by an oval wire ring 49 and one of the tubes 47 is provided with an eye 35A for attachment of one end of the cable or rope 26. Two rods 50, 51 are telescopically slidably adjustable at their inner ends in the tubes 46, 47 and their free outer ends are provided with land marking fingers 38A, 39A like the ones previously described in connection with the preferred form of the invention.

These two rods 50, 51 as well as the two rods 36, 37 previously described in connection with Fig. 2 are of lengths to differently offset the marking fingers 38, 39 or 38A, 39A relative to the implement shanks 13, 15. The rods 36, 50 offset their associated land markers 38, 38A distances from the implement shank 13 commensurate with a predetermined single row spacing whereas the other rods 37, 51 offset their associated land markers 39, 39A distances from the implement shank 13 commensurate with a plurality of row spacings, for instance, distances equivalent to three row spacings.

In the use of either form of row markers for marking corn or cotton rows it is only necessary to use the inner row markers 38 or 38A adjusted to obtain a predetermined single row spacing such as four feet. In laying off tobacco rows the inner and outer row marking fingers 38, 39 or 38A, 39A are both used when it is desired to leave out an intermediate row, for instance, in order to comply with the crop reduction program of the U. S. Department of Agriculture or to provide a double row space every so often in the field along which a tractor and equipment such as a tobacco sprayer or a tobacco harvester can be driven between the rows. In this case the inner marking finger 38 or 38A may be adjusted to give a suitable row spacing such as four feet and the outer marker 39 or 39A may be adjusted to give an eight foot row spacing parallel to the row being marked by the inner marking finger.

Various changes may be made in the forms of invention herein shown and described without departing from the spirit of the invention or the scope of the following claims.

I claim:

1. Row marking equipment comprising two tubes, means including a bracket releasably attachable to the shank of an agricultural implement for supporting said tubes in parallel relation for vertical swinging movement, two rods each having an inner end portion telescopically slidable in a different one of said tubes and an outer end portion, said rods being each provided at its outer end portion with a land marker, one of said rods being of a length to offset its associated land marker a distance from the implement shank commensurate with a predetermined single row spacing and the other of said rods being of a length to offset its associated land marker a distance from the implement shank commensurate with a plurality of said row spacings.

2. Row marking equipment comprising a pair of tubes, means including a bracket releasably attachable to the shank of an agricultural implement for pivotally supporting said tubes in adjacent parallel relation for vertical swinging movement, two rods each having an inner end portion telescopically slidable in a different one of said tubes and an outer end portion, said rods being each provided at its outer end portion with a land marker, one of said rods being of a length to offset its associated land marker a distance from the implement shank commensurate with a predetermined single row spacing and the other of said rods being of a length to offset its associated land marker a distance from the implement shank commensurate with a plurality of said row spacings.

References Cited in the file of this patent
UNITED STATES PATENTS

| 745,629 | Kocks | Dec. 1, 1903 |
| 1,025,040 | Woods et al. | Apr. 30, 1912 |
| 1,058,054 | Hallenbeck | Apr. 8, 1913 |